US007331454B2

(12) United States Patent
Godshaw et al.

(10) Patent No.: US 7,331,454 B2
(45) Date of Patent: Feb. 19, 2008

(54) WHEELED TOOL BAG

(75) Inventors: Donald E. Godshaw, Evanston, IL (US); Andrezj M. Redzisz, Wheeling, IL (US)

(73) Assignee: Travel Caddy Inc., Elk Grove Village, IL (US)

( * ) Notice: Subject to any disclaimer, the term of this patent is extended or adjusted under 35 U.S.C. 154(b) by 235 days.

(21) Appl. No.: 11/223,347

(22) Filed: Sep. 9, 2005

(65) Prior Publication Data

US 2007/0056868 A1 Mar. 15, 2007

(51) Int. Cl.

| | |
|---|---|
| ***B65D 85/28*** | (2006.01) |
| ***A45C 5/14*** | (2006.01) |
| ***A45C 13/26*** | (2006.01) |
| ***A45C 13/36*** | (2006.01) |
| ***B62B 1/00*** | (2006.01) |
| ***B62B 7/02*** | (2006.01) |

(52) U.S. Cl. .................... 206/373; 190/18 A; 190/117; 190/124; 190/127; 280/37; 280/47.26

(58) Field of Classification Search ................ 206/349, 206/372–373; 190/18 A, 117, 124, 127; 280/37, 47.26

See application file for complete search history.

(56) References Cited

U.S. PATENT DOCUMENTS

| | | | | |
|---|---|---|---|---|
| 6,550,592 | B1 * | 4/2003 | Godshaw et al. | 190/18 A |
| 6,571,998 | B2 * | 6/2003 | Godshaw et al. | 206/373 |
| 6,823,992 | B2 * | 11/2004 | Redzisz | 206/373 |
| 6,915,902 | B2 * | 7/2005 | Brouard | 206/373 |
| 6,945,442 | B2 * | 9/2005 | Godshaw et al. | 206/373 |
| 7,004,481 | B1 * | 2/2006 | Stanish | 280/37 |
| 7,048,101 | B2 * | 5/2006 | Godshaw et al. | 190/18 A |
| 7,150,345 | B2 * | 12/2006 | Redzisz | 206/373 |
| 2003/0042157 | A1 * | 3/2003 | Mays | 206/373 |
| 2005/0034949 | A1 * | 2/2005 | Davies | 190/18 A |
| 2006/0011502 | A1 * | 1/2006 | Redzisz | 206/373 |

* cited by examiner

*Primary Examiner*—Bryon P Gehman
(74) *Attorney, Agent, or Firm*—Banner & Witcoff, Ltd.

(57) ABSTRACT

A tool bag with wheels includes a base and back side reinforced by a polymeric board covered with a fabric material. Wheel wells and telescoping handle affixed to the polymeric sheet or board facilitate maintenance of the configuration of the open topped tool bag. Additional polymeric boards and/or ribs are included in the lateral side walls and a front wall to further facilitate the maintenance of the configuration of the open topped, wheeled tool bag.

9 Claims, 6 Drawing Sheets

FIG. 4
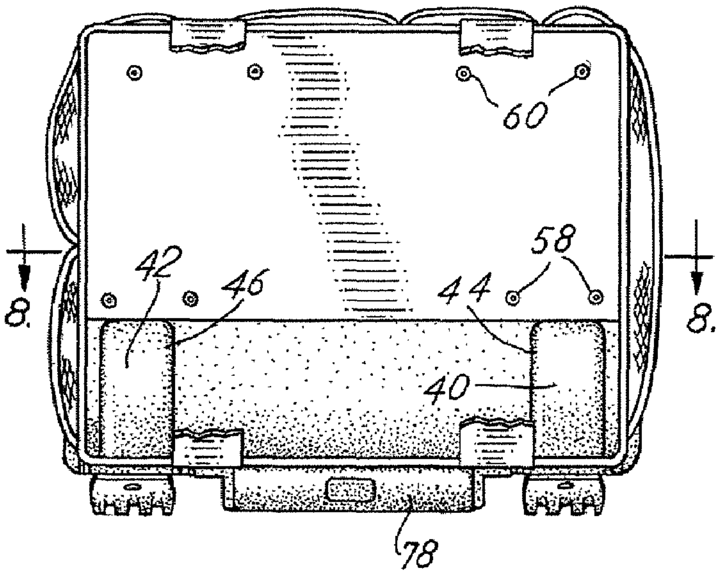
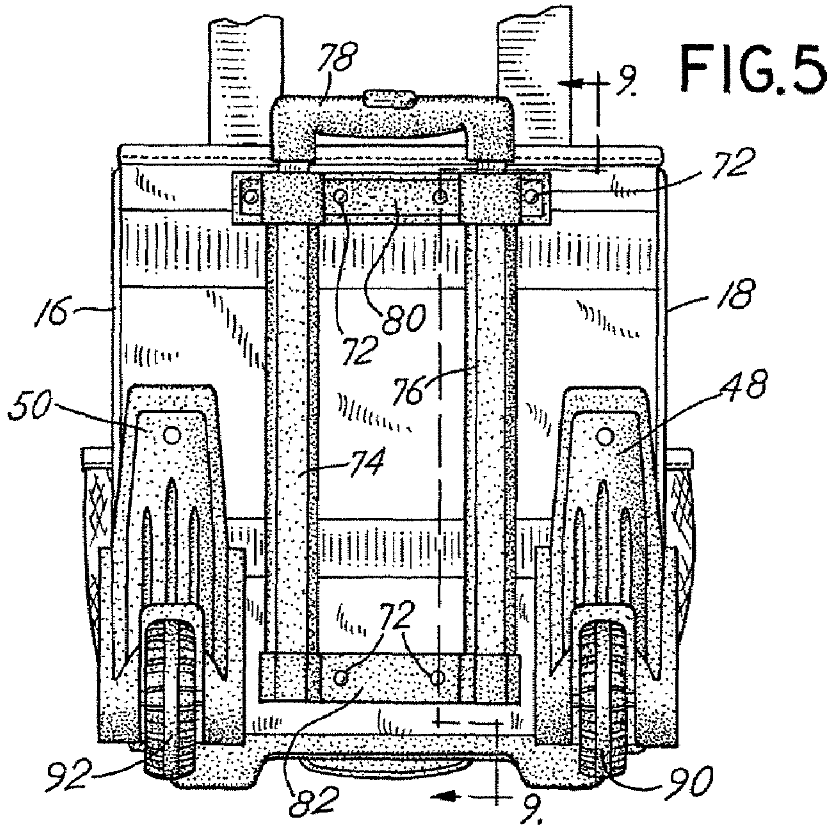
FIG. 5

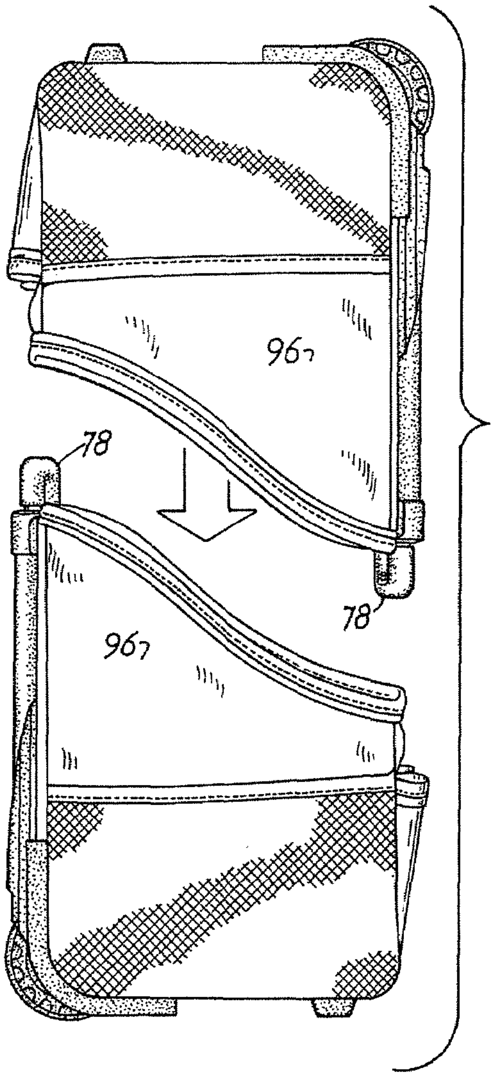
FIG. 11
FIG. 12
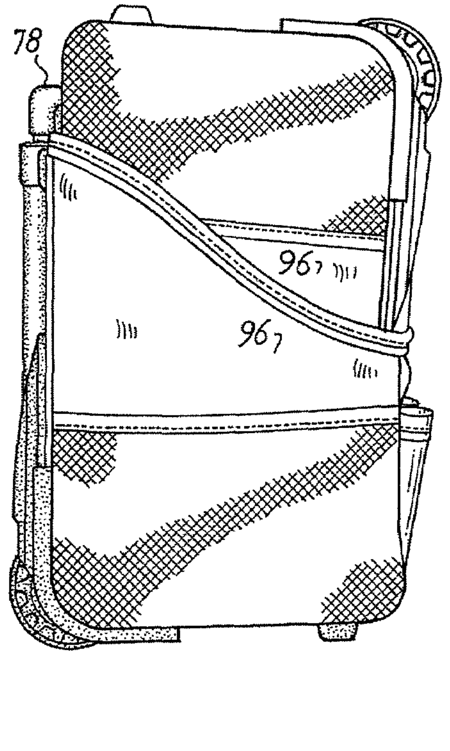

WHEELED TOOL BAG

BACKGROUND OF THE INVENTION

In a principal aspect the present invention relates to a tool bag or container with wheels for holding and transport of work tools and the like.

Workman, craftsmen, mechanics and others often have a collection of tools or items which they utilize at a particular work site and which they may find occasion to transport from one site to another. Carrying a heavy tool case often becomes burdensome. Additionally, when moving from site to site, it is often inconvenient to carry, to open and to close a tool chest constantly in order to have access to necessary tools.

Thus, there has developed a need to provide a tool carrier or tool bag which enables storage of tools in an assessable manner and which also is capable of easy portability.

Additionally, tool carriers or tool bags incorporate or include bag sidewalls which are generally rigid so as to maintain the shape of the bag when the tools or contents are removed from the bag. This enables the bag to be open when the user of the bag desires to place items, such as tools, in the bag. As a consequence of the general necessity to have the bag provide an open top or open configuration to facilitate its use, the storage and shipment of such bags will often require a large container. Shipping multiple bags thus can result in the necessity to provide for bulky packaging and thus increase the cost of shipment. Methodologies to address concerns of this nature include manufacture of collapsible bags, however, collapsible bags often require assembly by the purchaser. Consequently, collapsible bags are not necessarily favored. As a result, various approaches have been sought to facilitate generally rigid sided shipment of rigid sided multiple bags.

Another issue with such bags is associated with the utilization of a telescoping handle and wheels that are often considered desirable for such bags. As an alternative to utilizing the telescoping handle and wheels, carry handles are often provided. However, the carry handles may result in causing the bag to rub against the leg or side of the person carrying the tool bag. Consequently, various issues arise relating to the fact that the bag may be uncomfortable to carry or move. All of these problems associated with such prior art bags present themselves as challenges for bag design. Particularly, bag design of open top tool bags.

SUMMARY OF THE INVENTION

Briefly, the present invention comprises a tool bag or carrier with wheels wherein a generally rectangular base and back side of the tool bag are formed from a single polymeric sheet of material which is generally covered on the outside face with a fabric sheet. The back side and base include wheel wells that maintain the shape of the tool bag. A reinforcing board is fixed to the inside of the base and a skeg is attached on the outside to that reinforcing board, the polymeric sheet and fabric cover. A bracket and telescoping handle is attached to the back side of the tool case to further facilitate maintaining the shape of the tool bag. The lateral sides of the tool bag and the front side of the tool bag extend upwardly from the base and are connected to one another to form an open top enclosure having a generally rectangular profile. Auxiliary handles may be utilized to carry the tool bag, the handles being attached to the front side and back side of the tool case or bag. In a preferred embodiment the lateral sides and front side of the bag are configured to facilitate access to the tool bag. That is, the front side has a lesser vertical height than the back side and the lateral sides then slope downwardly to join the front side to the back side. Further, the lateral sides as well as the front side include reinforcing elements such as a polymeric board or polymeric or metal rods or other members inserted between layers of fabric to provide for shape retention and reinforcement. Pockets may be provided on the outside of the tool bag.

As a further feature of the bag, the configuration of the bag though generally in the form of a rectangular parallelepiped, the bag of the invention contemplates manufacture of the open top portion of the bag to have narrower dimensional characteristics than the bottom of the bag. As a consequence, two bags of substantially similar design may be inserted or nested one into the other by placing the narrow top side of one bag into the top side of another bag. Because there is some flexibility in the panels that form the bag, the bags may be nested one into the other by inserting the top of one bag into the top of another bag. This enhances the opportunity to ship pairs of bags in a single container and nested together thereby enhancing the efficiency of shipment of the bags.

As a further feature of the invention, the handles which are joined to sides of the bag for manual carrying of the bag are arranged so that when the bag handles are gripped, the wheels of the bag will be inclined or tipped outwardly away from the side of the individual carrying the bag. That is, a handle attached to the telescoping handle attachment side of the bag will be foreshortened relative to the handle attached to the front side of the bag. Then when the two handle straps are gripped, the bag will be tilted slightly outwardly with the wheels being positioned away from the side of the individual carrying the bag. The design of the handle strap enables the bag to maintain its contents whiles at the same time preventing rubbing or undesirable engagement of the front side of the bag with the individual that is carrying the bag.

Thus, it is an object of the invention to provide an improved tool bag with wheels.

Another object of the invention is to provide a tool bag with wheels and a telescoping handle for ease of transport of the tool bag.

Another object of the invention is to provide a tool bag having an open top.

A further object of the invention is to provide a tool bag with an open top and further including handles that may be utilized to carry the tool bag.

Another object of the invention is to provide a tool bag having a base formed from the single polymeric sheet that is configured to also form the base and back side of the tool bag and which further incorporates wheel wells which facilitate maintaining the configuration of the polymeric sheet forming the back side and base of the tool bag.

Another object of the invention is to provide a tool bag which includes a base comprised of a polymeric sheet, an inner reinforcing board and an outer fabric cover.

Another object of the invention is to provide a wheeled tool bag wherein a base and a back side of the tool bag are comprised of a formed polymeric sheet having a fabric cover over the polymeric sheet.

Another object of the invention is to provide a tool bag which is light weight, economical, rugged and inexpensive.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 4 is a top plan view of the tool bag of FIG. 1;

FIG. 5 is a back side view of the bag of FIG. 1;

FIG. 11 is a side elevation depicting the manner in which two bags of substantially the same design and configuration may be nested one into the other for purposes of facilitating shipment; and FIG. 12 is a side elevation similar to FIG. 11 wherein one bag is nested into another.

DESCRIPTION OF THE PREFERRED EMBODIMENT

Figure 1:
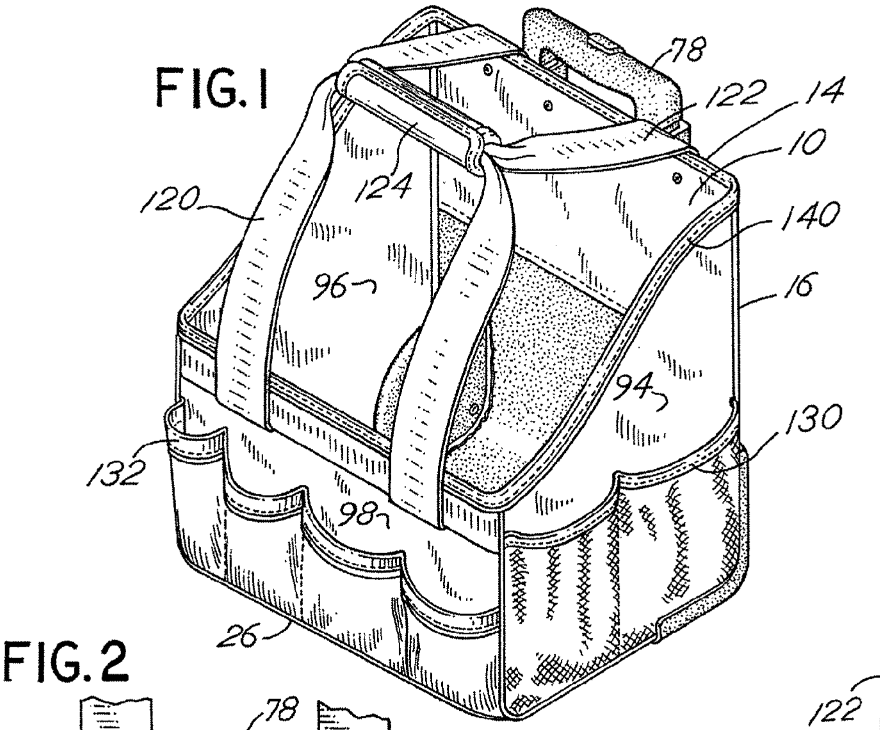
FIG. 1 is an isometric view of the tool bag of the invention.
Figure 2:
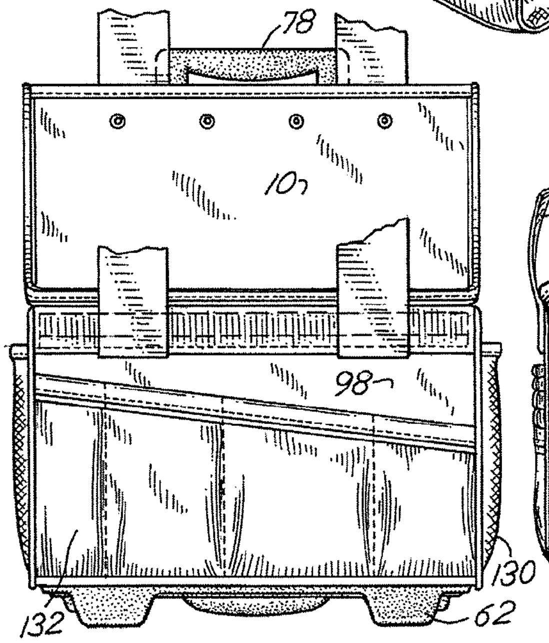
FIG. 2 is a front side elevation of the tool bag of FIG. 1.
Figure 3:
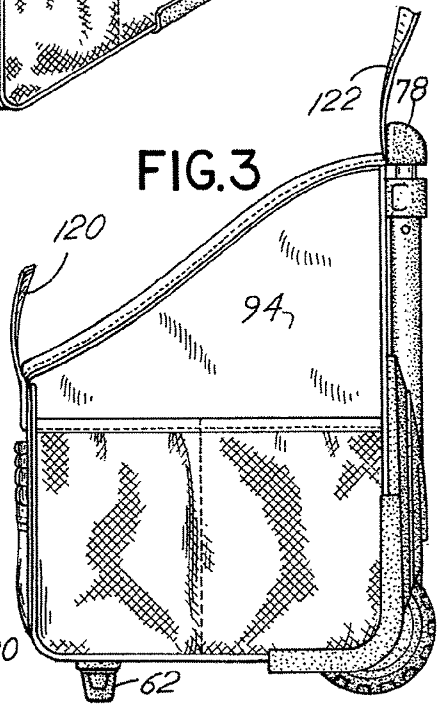
FIG. 3 is a right hand side view of the tool bag of FIG. 2.
Figure 6:
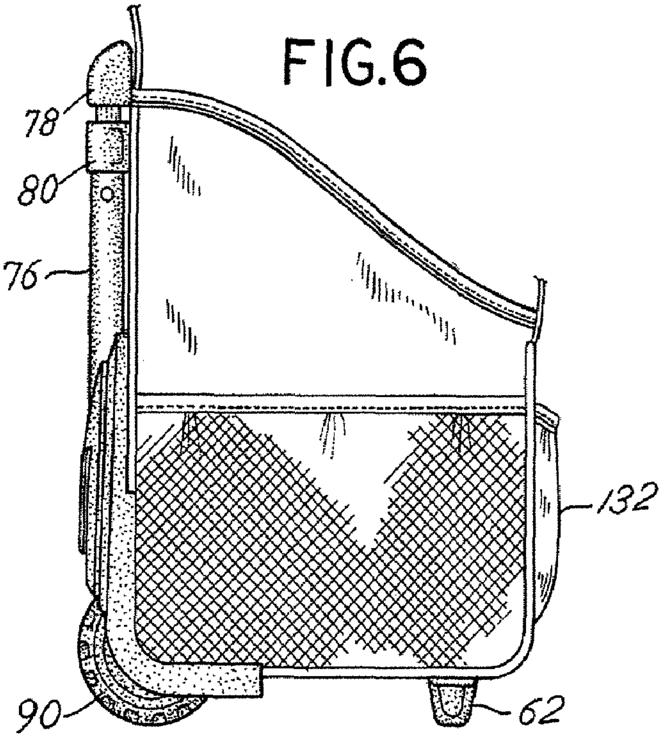
FIG. 6 is a side elevation of the right hand side of the bag of FIG. 5.
Figure 7:
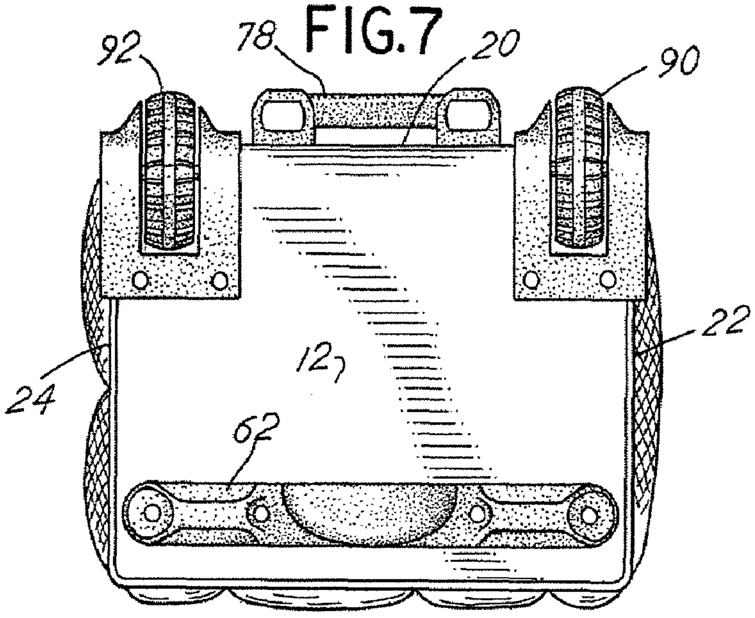
FIG. 7 is a bottom side view of the bag of FIG. 1.

Referring to the figures, the tool carrier or bag of the invention includes a generally vertical back side 10 connected with an integrally formed, generally horizontal base 12. The back side 10 includes a top edge 14, a first lateral side edge 16 and a second lateral side edge 18. The base 12 includes a back side edge 20, a first lateral side edge 22, a second lateral side edge 24 and a front side edge 26. The base 12 and back side 10 are formed from a single polymeric sheet 30 which includes a vertical run 32 and a horizontal run 34. Included and formed at the juncture of the vertical run 32 and the horizontal run 34 are first and second spaced slots 36 and 38 into which wheel wells 40 and 42 are inserted. The wheel wells 40 and 42 each include a generally semi-circular inner shell section 44 and 46 respectively and an outer reinforcing rib member 48 and 50 respectively. The wells 40, 42 serve to maintain the shape of configuration of horizontal base 12 and vertical back side 10.

Figure 9:
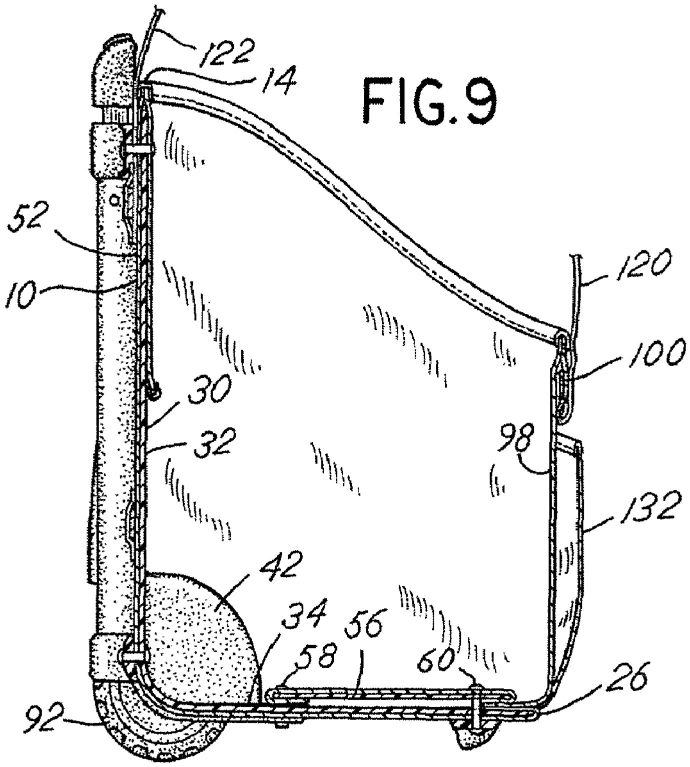
FIG. 9 is a cross-sectional view of the tool bag of the invention taken along the line 9-9 in FIG. 5.

A fabric sheet 52 is fitted over the polymeric sheet 30 and folds over the top edge 14 as well as the front side or forward edge 26 of base 12 as depicted in FIG. 9. A reinforcing, rectangular base board member 56 is fastened by means of rivets, for example rivets 58, to the polymeric sheet 30 and more particularly to the inside of horizontal run or base 12 thereof. Rivets 60 serve to attach the polymeric sheet 30 as well as the reinforcing base board 56 to a lower skeg 62 positioned adjacent the forward edge 26.

The wheel wells 40 and 42 are affixed by rivets to the cover sheet 52 and polymeric board 30. The wheel wells 40 and 42 thus conform and maintain the shape of the back side 10 and bottom side 12 so that the back side 10 may be maintained in a vertical configuration and the bottom side may be maintained in a horizontal configuration. Also attached by rivets, such as rivets 72, to the back side 10 as a shape maintaining reinforcement is a telescoping handle comprised of a first vertical telescopic section 74 and a spaced second, vertical telescopic section 76. Sections 74, 76 are connected by a handle 78 and bracket members 80 and 82. Thus, the telescoping handle may be extended and wheels 90 and 92 within the associated wheel walls can then be utilized to transport the wheeled tool bag.

Figure 8:
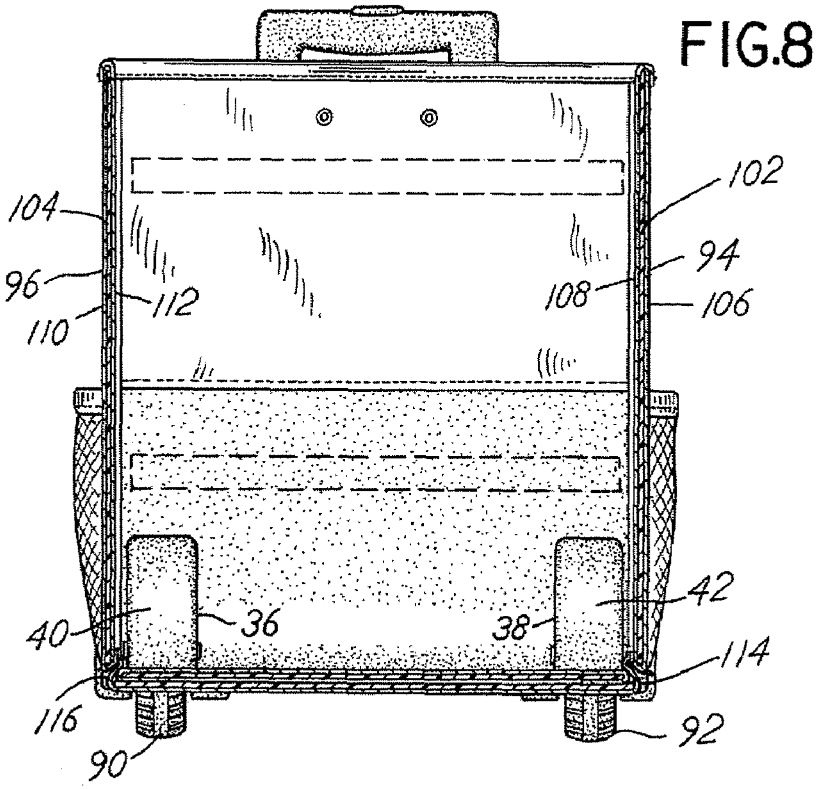
FIG. 8 is a cross-sectional view taken along the line 8-8 in FIG. 4.

The wheeled tool bag further includes a first lateral side 94 and a second lateral side 96 as well as a front side 98. The front side 98 is comprised of a fabric panel with a reinforcing rib member 100 sewn therein generally along the top edge thereof. The lateral sides 94 and 96 are, as depicted in FIG. 8, comprised of polymeric boards 102 and 104 which are retained between fabric panels 106 and 108, 110 and 112. The first and second lateral sides 94 and 96 are attached to the lateral side edges 114 and 116 of the base 12. Such attachment is effected by sewing of the fabric panels described. The polymeric boards 102 and 104 have a shape which generally conforms to the shape of the side panels 94 and 96 and thus provides for some rigidity of those component parts to maintain the form and shape of the tool bag. The front side 98 of the tool bag maintains its shape due to the reinforcing bar 100 which extends between the lateral sides 94 and 96.

A first handle 120 is attached to the front side 98 and a second handle 122 is attached to the back side 10. A grip 124 with a hook and loop fastener (Velcro fastener) is utilized to connect the handles 120 and 122 together at their midpoint and allows release of the handles 120, 122 for access to the interior of the space created by the walls 10, 12, 94, 96 and 98. Thus, the sides of the tool bag in combination with the base 12 form an open top container into which tools and other items may be placed.

Figure 10:
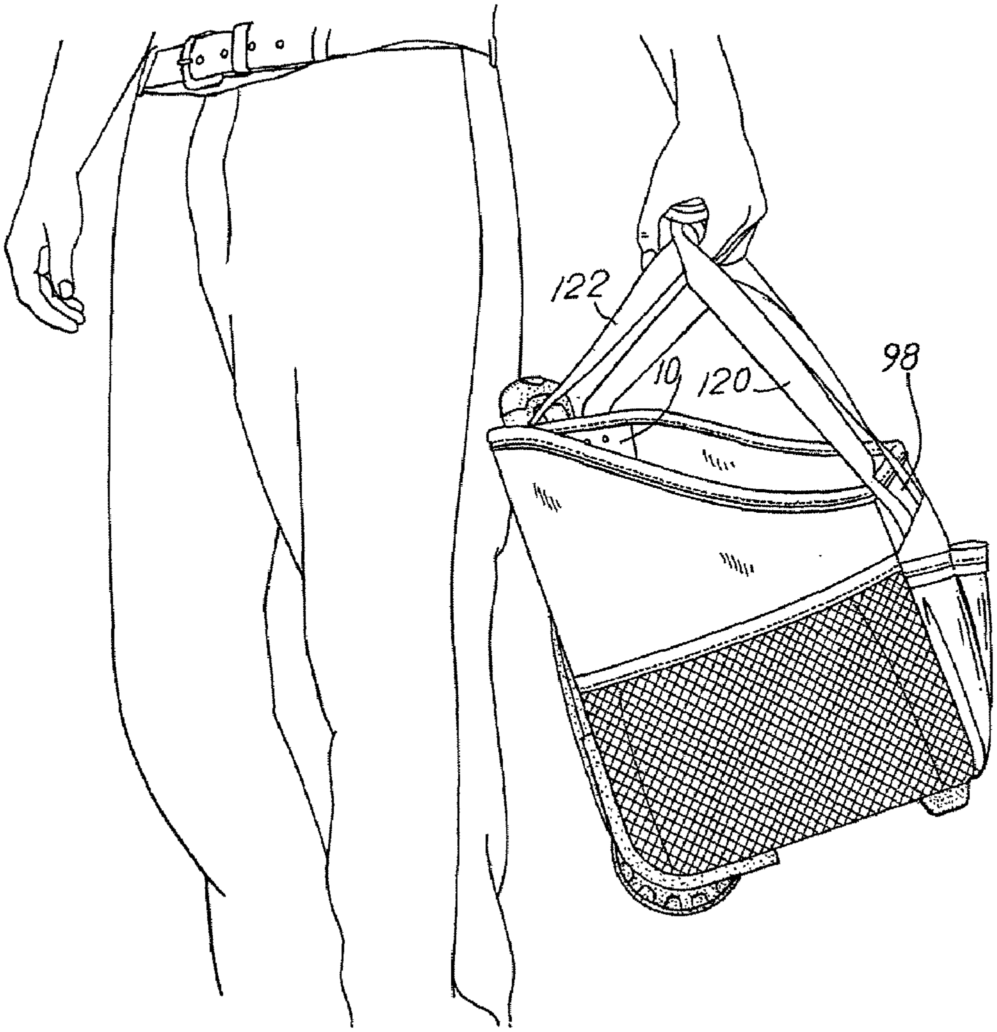
FIG. 10 is an isometric view of a bag of the invention wherein the carry handles are utilized by an individual to carry the bag and its contents.

The first handle 120 attached to the front side 98 is longer relative to the second handle 122 attached to the back side 10 when the handles are connected together. That is, each handle 120 and 122 comprise a strap attached respectively to the front side 98 and the back side 10. The length of the strap is associated with the first handle 120 is greater than the length of the strap associated or comprising the second handle 122. Consequently, when the straps or handles 120 and 122 are connected or joined, they will, when suspended, hold the tool carrier or tool case in a manner which causes it to be canted or inclined outwardly in the direction of the wheels. Thus, the handles 120 and 122 when gripped by an individual will cause the tool bag or tool carrier to tilt outwardly away from the individual when the front side 98 is positioned adjacent the hip or leg of an individual. This is illustrated in FIG. 10.

As an alternative, the handles 120 and 122 may be designed so as to hold the carrier bag vertically. However, having the handles of distinctive lengths wherein the back-side handle 122 is foreshortened relative to the front side handle, the handles still support the carrier appropriately, but do provide for a tilting slightly so as to preclude rubbing or bumping of the carried bag against the side of an individual. Of course, the handles 120 and 122 may be adjustable in length to achieve this function.

A number of peripheral side storage pockets, such as pocket 130 and pocket 132 may be affixed to the fabric defining the various sides of the tool bag. The vertical height of the front side 98 is less than the vertical height of the back side 10 and the shape of the lateral sides 94 and 96 serves to smoothly join the back side 10 to the front side 98. Peripheral binding 140 is provided to join the various fabric panels forming the bag.

With the bag construction of the invention, a generally rigid form tool bag is provided wherein the back side 10 and base 12, which are covered by a fabric layer 30, provide a basic form for the bag in combination with the reinforcing wheel wells 40 and 42 which ensure the maintenance of the shape of the bag. The wheel wells 40 and 42 in combination with the wheels 90 and 92 as well as the skeg 62 provide for stability of the tool case and enable transportation when the case is lifted by means of the handles 120 and 122 or prepared for movement by the telescoping handle. As a result of the construction, access to the contents of the tool bag is maintained, yet the bag provides a stable means for conveyance of tools.

As a further feature of the invention, the dimensions associated with the top of the carrier or bag, namely the lateral side to side dimensions of each of the sides of the carrier, are slightly less than the dimensions associated with the bottom side or adjacent the base of the carrier. Further, because of the construction as previously described, the various sides enjoy some flexibility with respect to one another particularly along the seams or edges which join the sides. As a consequence, when the telescoping handle is in its reclined or recessed position, the top of a bag can easily receive the top side of a second bag so that the bags may be nested in a posed relationship one in the other as shown in FIG. 11. By providing that the dimensions of the top of the bag are slightly less than the dimensions associated with the bottom of the bag, it is possible to achieve the nesting function so described. This depends, in part, upon the flexibility of the various component parts. However, their flexibility is limited, of course, by the various boards and reinforcing elements previously described. Consequently, an appropriate compromise between flexibility and rigidity enables insertion of a bag which maintains an open top and a configuration for easily receiving and supporting tools by way of example. Further, however, the bag permits coupling or joining of a pair of bags for bulk shipment thereof in pairs as illustrated.

Variations of the construction may be effected without departing from the spirit and scope of the invention. The particular configuration of the wheel wells and handles as well as the particular configuration of the side walls and other walls comprising the tool bag may be varied without departing from the spirit and scope of the invention by way of example. Thus, the invention is to be limited only by the following claims and equivalents thereof.

What is claimed is:

1. A tool bag with wheels comprising, in combination:

a generally rectangular base with a front side edge, a back side edge, a first lateral side edge and a spaced second lateral side edge generally parallel to the first side edge, an inside and an outside;

a generally rectangular back side extending upwardly from the back side edge, said base and back side comprised of a single polymeric sheet having a first and second spaced wheel wells positioned in said back side edge adjacent respectively the first and second lateral side edges;

a reinforcing telescoping handle mounted on the back side, for telescopic extension vertically upward from the back side;

a single fabric cover sheet overlying the back side and base intermediate the telescoping handle and said polymeric sheet;

a reinforcing board on the inside of the base attached to the polymeric sheet;

a support skeg on the outside of the base adjacent the front side edge attached to the polymeric sheet and reinforcing board;

a respective wheel rotatably mounted in each wheel well, said wheels each having a diameter to maintain the base in combination with the skeg substantially horizontal;

a first lateral side on the base extending upwardly from the first lateral side edge;

a second lateral side on the base extending upwardly from the second lateral side edge;

a front side extending upwardly from the front side edge; and said front side joined to the first and second lateral sides, and said back side joined to said first and second lateral sides to form an open top storage enclosure.

2. The tool bag of claim 1 including first and second handles attached respectively to the front side and back side.

3. The tool bag of claim 2 including an attachment member for connecting the first and second handles.

4. The tool bag of claim 1 wherein the first and second lateral sides are comprised of a polymeric sheet inserted between fabric sheets.

5. The tool bag of claim 1 wherein the front side includes a reinforcing member to maintain the form of the front side.

6. The tool bag of claim 1 wherein the lateral sides each include a reinforcing member to maintain the form thereof and the front side includes a reinforcing member to maintain the form thereof.

7. The tool bag of claim 4 wherein the front side is comprised of a fabric sheet with a reinforcing element extending between the first and second lateral sides.

8. The tool bag of claim 1, wherein the first and second lateral sides, front side and back side are dimensionally of lesser side to side lateral cross dimension along the top edge relative to the bottom edge thereof.

9. The tool bag of claim 1 wherein a handle strap attached to the front side has a relatively greater length than a handle strap attached to the back side whereby the handles straps, when joined, will form a means for carrying the bag canted outwardly in the direction of the wheels and telescoping handle.

* * * * *